United States Patent [19]
Jeffries et al.

[11] Patent Number: 6,078,814
[45] Date of Patent: Jun. 20, 2000

[54] MEANS OF INCREASING CAPACITY IN CELLULAR RADIO (MOBILE AND FIXED) SYSTEMS

[75] Inventors: Andrew William Jeffries, Saffron Walden; Christopher Robert Ward, Bishops Stortford; John Edward Hudson, Stansted, all of United Kingdom

[73] Assignee: Nortel Networks Corporation, Montreal, Canada

[21] Appl. No.: 08/957,209

[22] Filed: Oct. 24, 1997

[30] Foreign Application Priority Data

Aug. 29, 1997 [GB] United Kingdom ............... 97 18248

[51] Int. Cl.$^7$ ........................................ H04Q 7/00
[52] U.S. Cl. ............................... 455/447; 455/449
[58] Field of Search ........................... 455/447, 448, 455/449, 446, 561, 63, 422

[56] References Cited

U.S. PATENT DOCUMENTS 5,073,971  12/1991  Schaeffer ........................... 455/447

FOREIGN PATENT DOCUMENTS

| | | |
|---|---|---|
| 0720405 | 7/1996 | European Pat. Off. . |
| 2308275 | 6/1997 | United Kingdom . |
| WO9103911 | 3/1991 | WIPO . |
| WO9634505 | 10/1996 | WIPO . |

*Primary Examiner*—Thanh Cong Le
*Attorney, Agent, or Firm*—Baker Botts L.L.P.

[57] ABSTRACT

A method of configuring a plurality of directional beams in a cellular radio system having a plurality of antennas each communicating over a corresponding respective cell area by re-arrangement of directional beams using a same or like carrier frequency to each other, so as to be directed away from each other, and by restricting signal loading on beams experiencing worst case interference. Interference between geographically close cells is reduced by the method resulting in an improvement in carrier to interference ratio performance. Carrier frequencies of the inner two beams transmitted by an antenna are exchanged for the inner two beams which are transmitted in substantially the same direction by another antenna. Inner beams experiencing highest interference are restricted so as to operate at below their maximum signal load in order to reduce interference within the network. This results in an improved carrier to interference performance for all beams and may allow increased use of a lower frequency reuse factor. The techniques disclosed are applicable to center-excited or corner excited (tri-cellular) systems.

20 Claims, 6 Drawing Sheets

MEANS OF INCREASING CAPACITY IN CELLULAR RADIO (MOBILE AND FIXED) SYSTEMS

FIELD OF THE INVENTION

The present invention relates to a method of operating an antenna arrangement in a cellular communications system and more particularly to methods of assigning frequencies to multi-beam directional antennas, and of utilizing those frequencies.

BACKGROUND TO THE INVENTION

In conventional cellular radio systems, geographical areas are divided up into a plurality of adjoining cells, in which mobile stations within a cell communicate with a base transceiver station. In general, each mobile (or set of mobiles sharing a multiplexed channel) communicating with a base station in a cell uses a different carrier frequency to other mobiles in the cell, to avoid interfering with the other mobiles. Thus the number of mobiles which can be served in a cell is limited by the number of available carrier frequencies. There is increased capacity demand for use of cellular radio systems, however the frequency band within which cellular radio systems operate is limited in width, and so to provide increased capacity in the system, available carrier frequencies are re-used from cell to cell.

The re-use of frequencies in a locality is restricted by co-frequency interference between different cells which re-use the same or close frequencies and which are geographically close to each other. To obtain maximum capacity in a system comprising a plurality of cell areas, cellular radio system designers aim to re-use as many different carrier frequencies of the set of available carrier frequencies as possible in each cell. However there are limits on the re-usage of carrier frequencies in a cell due to other potentially interfering signals, particularly from:

(1) interference between a carrier frequency in a first cell and an identical frequency re-used in neighboring cells and
(2) interference between a carrier frequency used in a first cell and adjacent carrier frequencies used in neighboring cells.

The minimum physical distance between geographic cells which re-use a same carrier frequency or an adjacent carrier frequency is limited by the required quality of signals received at the carrier frequency. One metric used to describe the quality of the signal is referred to in the art as the carrier to interference ratio (C/I ratio). The C/I ratio is a ratio of signal strength of a received desired carrier frequency to a signal strength of received interfering carrier frequencies and noise. A number of physical factors can affect the C/I performance in cellular systems including reflections from buildings, geography, antenna radiation patterns, mobile station transmitting power, and mobile station locations within a cell. In general, calculating the distances between cells which re-use an interfering carrier frequency is a complex problem, however a general approach to the calculations may be found in Mobile Cellular Telecommunications Systems by William Chien-Yeh Lee published by McGraw Hill Book Company, New York 1989.

Taking as an example a Digital Amps TDMA (time division and multiple access) system having available 12.5 MHz of frequency spectrum, for example in the 850 MHz band, individual carrier frequencies are spaced apart from each other centered at spacings of every 30 KHz, giving a total of 416 carrier frequencies available across the network as a whole. The 416 carrier frequencies are partitioned so that individual carrier frequencies are re-used from cell to cell.

Taking as an example a base station re-use factor n of 7 (n=7), for center-excited cells each cell is allocated 416÷7= 59 carrier frequencies per cell.

However, with a base station re-use factor of n=4, this gives 416÷4=104 carrier frequencies per cell, resulting in a higher capacity than for an n=7 re-use factor. At a base station re-use factor of n=4 cells which re-use a same carrier frequency (the frequency re-use cells) are closer to each other than at a base station re-use factor n=7, resulting in more interference, and a lower C/I ratio in the base station re-use factor n=4 case than in the base station re-use factor n=7 case. To implement the lower base station re-use factor (n=4) frequency, re-use cells must be closer together than with a higher base station re-use n=7. However, the distance between the re-use cells must be great enough so that the carrier to interference ratio is high enough to allow the cellular radio telecommunications apparatus to distinguish signals at each re-used carrier frequency in one cell from the interfering frequencies present in other cells across the network. The C/I performance is a limiting factor in implementation of a lower base station re-use factor.

SUMMARY OF THE INVENTION

An object of the present invention is to provide an improved carrier to interference ratio for a plurality of beams which re-use frequencies from beam to beam, and to provide an acceptably low level of interference overall, thereby allowing greater re-use of frequencies and providing a capacity gain for a cellular radio communication system.

According to a first aspect of the present invention there is provided in a cellular radio communications system comprising a plurality of base stations each capable of communicating over at least one corresponding respective cell area using a plurality of directional beams, a method of configuring the plurality of directional beams comprising: arranging the plurality of beams across the plurality of cells such that a pair of beams which reuse a like carrier frequency as each other are disaligned with each other; selecting at least one beam reusing a like carrier frequency; and restricting usage of the like carrier frequency on the selected beam.

By disaligning directional beams which reuse a like carrier frequency as each other, and by restricting usage of at least one of those beams, a significant improvement in carrier to interference ratio may be experienced.

By optimization of disalignment of beams employing like carrier frequencies as each other and optimizing restriction of usage of those carrier frequencies as a percentage of time transmitted, interference may be reduced as between frequency reuse beams to a level which enables a next level of frequency reuse to be employed, thereby enabling an increase in overall system capacity by improved frequency reuse over a plurality of cells.

Preferably the step of arranging the plurality of beams comprises: at a first base station, forming a first set of beams in a first cell area; at a second base station, forming a second set of beams in a second cell area; wherein at least one beam of the first set is directed in a substantially same direction to and reuses a first like frequency as at least one beam of the second set; and at least one remaining beam of the first set reuses a second like frequency as at least one remaining beam of the second set, the remaining beam of the first set being disaligned away from the remaining beam of the second set.

Preferably the step of restricting usage comprises restricting a proportion of time during which the like carrier frequency is available for transmission on the selected beam.

Within the plurality of base stations, there may exist a plurality of the pairs of beams. A first beam of a pair of beams may be formed at a first base station; and a second beam of said pair of beams may be formed at a second base station; wherein the first and second base stations are first tier frequency reuse base stations. A first cell may have inner and outer beams; and a second cell may have inner and outer beams, wherein usage of an inner beam may be restricted. Within the plurality of cells, restrictions on usage of individual beams causing significant levels of interference may be applied. Preferably a selected beam comprises a beam causing a significant level of interference with the like carrier frequencies. The invention includes a cellular radio system employing a method as described in the first aspect.

According to a second aspect of the present invention there is provided in a cellular radio communications system comprising a plurality of base stations each capable of communicating over at least one corresponding respective cell area using a plurality of directional beams, a method of configuring directional beams comprising: arranging the plurality of beams across the plurality of cells, such that individual ones of the beams which reuse a like carrier frequency as each other are disaligned from each other; and restricting usage of the like carrier frequency on selected ones of the plurality of beams.

Suitably, the step of selecting comprises selecting a plurality of beams causing a significant level of like carrier frequency interference. Suitably, the step of disaligning comprises arranging a first beam operating a like carrier frequency such that an overlap of an azimuth beamwidth of the first beam with any like carrier frequency re-use beams at any first tier frequency re-use base stations, is reduced.

Over a communications network comprising a plurality of base stations, each operating directional beams where like frequencies are reused from beam to beam, the usage of the like carrier frequencies may be restricted on individual beams, depending upon levels of like carrier frequency interference caused to other beams in the network. A percentage of time that usage of a like carrier frequency on a particular beam is restricted may be optimized according to measurements made over a terrain area covered by the communications network.

According to a third aspect of the present invention there is provided a cellular radio communications system comprising: a plurality of base stations each capable of communicating over at least one corresponding respective cell area using a corresponding plurality of directional beams; wherein the directional beams use a common pool of carrier frequencies such that like carrier frequencies are reused as between different base stations, and usage of the carrier frequencies is restricted such that: a beam of a first base station using a first carrier frequency is disaligned with a beam of a second base station using like carrier frequency to the first carrier frequency; and the first carrier frequency is restricted in usage. Preferably the usage restriction may comprise a temporal restriction of transmission of the first carrier frequency on a beam.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

In the following there is described a specific implementation according to the present invention, comprising a method for improving carrier to interference ratio (C/I performance) of a cellular radio system by use of various techniques, used standalone or in combination with each other. The specific implementation presented may have advantages in addressing problems encountered when aiming for lower reuse factor in a digital AMPS (Advanced Mobile Phone System) TDMA (Time Division Multiple Access) deployment, in particular in achieving n=3 reuse in a digital AMPS TDMA deployment by improving the overall C/I ratio in such a deployment, and thereby allowing a lower frequency reuse factor to be achieved with consequent capacity increase. However, it will be understood by those skilled in the art that the methods disclosed herein may be more generally applicable in systems such as GSM (Global System for Mobile Communications), PCS (Personal Communications Service) 1900, DCS 1800, or other radio systems whether mobile or fixed, and the invention is limited only by the features recited in the claims herein.

Figure 1:
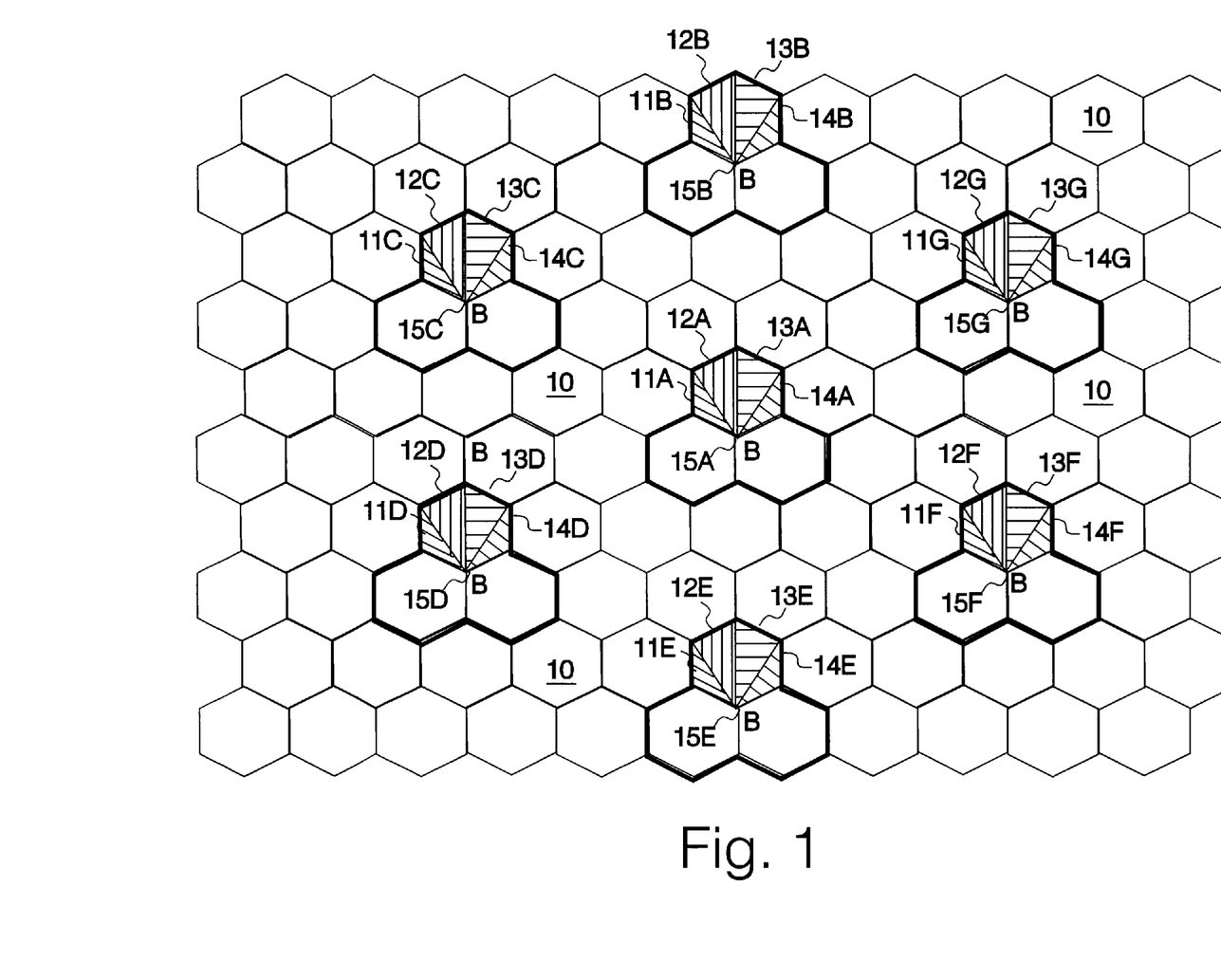
FIG. 1 illustrates a layout of edge excited directional beams in cells of a tri-cellular radio system, having frequency re-use between cells with four beams per cell.

Referring to FIG. 1 of the accompanying drawings there is illustrated a cellular radio system serving a geographical area divided into a plurality of adjoining hexagonal edge-excited cells 10 of substantially equal area to each other in a tri-cellular configuration in which a plurality of base stations B are each surrounded by a corresponding respective set of three hexagonal cells, which they serve. Each base station has one or more directional beam antennas 15. Each base station supports coverage of its three surrounding cells comprising a tri-cellular region. Tri-cellular regions are shown enclosed by a thickened line in FIG. 1.

A plurality of frequency re-use base stations B which use a common set of frequencies are arranged in a plurality of substantially straight lines which are approximately parallel to each other, the base stations of a line being spaced approximately equidistantly from each other along the line. Base stations of one line are positioned off-set to base stations of a neighboring line. Each tri-cellular area comprises three nominally hexagonal cell areas. Each cell area is served by a plurality of substantially radially extending beams extending outwardly from the base station and covering the area of the cell. The plurality of beams extend either side of a main length of the cell, the main length extending between a corner of the hexagonal cell at which the base station is situated, and a furthermost corner of the cell opposite the corner at which the base station is located. Each beam is of relatively narrow beamwidth, typically of the order 45° to 50° azimuth at the −3 dB gain contour.

A center base station 15A serving a center tri-cellular area is surrounded by a plurality of first tier frequency re-use base stations 15B–15G supporting a plurality of corresponding respective first tier frequency re-use tri-cellular areas as shown in dark lines in FIG. 1. For ease of description, hereinafter a method corresponding to one cell of each tri-cellular region, the tri-cellular regions supported by two base stations which are spaced apart from each other and re-use a common set of carrier frequencies will be described. It will be understood that coverage of all cells in the cellular radio system requires duplication of the method described hereinafter. In FIG. 1 a first set of directional beams has been labeled 11A, 12A, 13A and 14A for one of the cells covered by first frequency re-use base station 15A and a second set of directional beams has been labeled 11B, 12B, 13B and 14B for one of the cells covered by second frequency re-use base station 15B. When referring to FIG. 1 herein, a beam referred to by a number 11 shall represent beam 11A, 11B or any other beam of equivalent re-used carrier frequency and substantially similar direction transmitted by any other frequency re-use base station 15 in FIG. 1. Likewise beams referred to by a number 12, 13 or 14 shall represent beams of identical re-used carrier frequency and substantially similar direction of any frequency re-use base station 15 in FIG. 1. All other cells in FIG. 1 have a corresponding pattern of four beams 11 to 14 which use other frequencies but these are not illustrated for clarity.

In the arrangement of beams shown in FIG. 1, outer beam 11A supported by first base station 15A re-uses the same carrier frequency as outer beam 11B supported by second base station 15B. Likewise all inner beams 12, have the same carrier frequency as each other, and similarly all inner beams 13 re-use another same carrier frequency, and all outer beams 14 re-use a further same carrier frequency, as between the first and second base stations 15A, 15B in FIG. 1.

The cell served by first base station 15A containing first set of directional beams 11A–14A uses a same set of frequencies as second set of beams 11B–14B of second base station 15B serving the second tri-cellular area. Similarly, other surrounding frequency re-use base stations 15C, 15D, 15E, 15F, 15G, each serving a corresponding respective tri-cellular area, re-use the same frequencies as first base station 15A, allocating those re-use frequencies to corresponding respective third to seventh beam sets 11C–11G, 12C–12G, 13C–13G, 14C–14G as shown in FIG. 1. Each frequency re-use cell contains a set of directional beams 11–14. In each case, the directional beams extend radially about the corresponding respective base station, and either side of a main length of the corresponding respective cell served by the beam set. Each cell containing a beam set re-using a same set of frequencies has a main length extending in a same direction to each other cell re-using the same frequency set. Each beam of first beam set 11A–14A extends in a respective general direction which is the same as a corresponding respective beam 11B–14B of a corresponding cell comprising second tri-cellular area supported by second first tier re-use base station 15B.

The plurality of frequency re-use base stations 15 are arranged in such a way that for each cell of the tri-cellular area supported by the corresponding respective re-use base station 15, beams 11, 14 at an outer edge of each individual cell of the tri-cellular area extend along a line of sight pointing midway between corresponding respective outermost frequency beams 11, 14 of neighboring first tier re-use base stations. For example, outer beam 11A extends along the line of sight pointing to an area midway between corresponding respective outer beams 11B, 11C re-using a same frequency as 11A. Because beams 11A–C are directional, the likelihood of interference between these frequency re-use beams is reduced.

Figure 2:
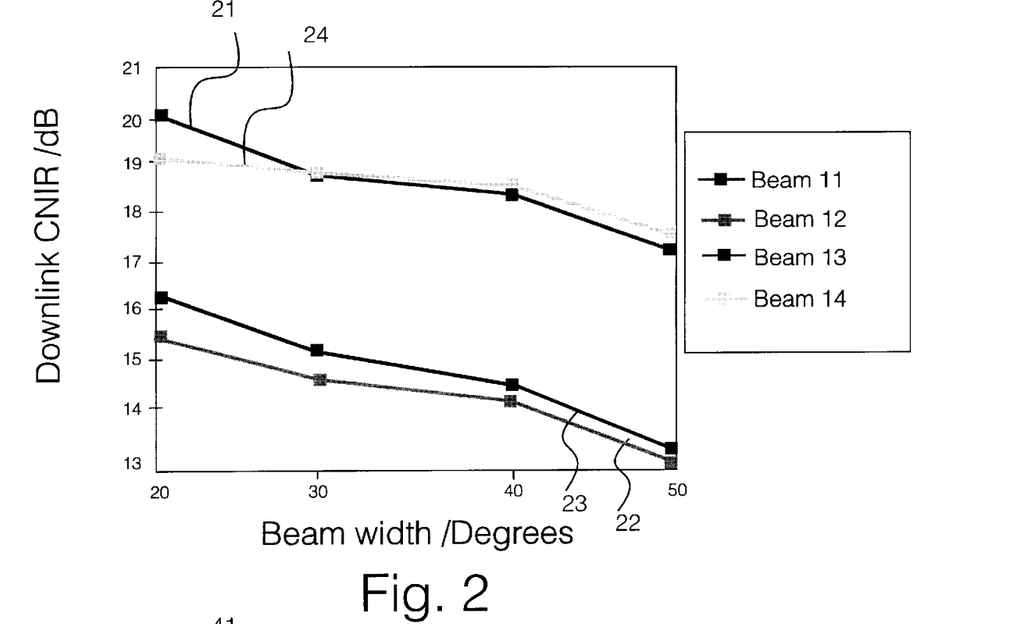
FIG. 2 illustrates a carrier to noise and interference ratio graph corresponding to the layout in FIG. 1.

Referring to FIG. 2 herein, there is illustrated carrier to interference ratio graphs corresponding to four beams of one cell of the layout shown in FIG. 1. Graph line 21 shows a plot of carrier to interference level in decibels on a vertical axis, against beam width on a horizontal axis for outer beam 11 in FIG. 1 over beamwidths in the range 20° to 50°. Likewise graph lines 22, 23 and 24 in FIG. 2 correspond to inner beams 12, 13 and outer beam 14 in FIG. 1 respectively.

As can be seen from graph lines 21 and 24 in FIG. 2 the outer two beams 11 and 14 of a cell in FIG. 1 have a relatively higher carrier to interference performance compared to inner beams 12, 13. Innermost beams 12A, 13A of the first base station 15A extend in a direction which points towards the corresponding respective inner beams 12B, 13B of adjacent first tier re-use cell of second first tier re-use base station 15B. Areas covered by inner beams 12B, 13B receive interference from corresponding inner beams of adjacent first tier frequency re-use base station 12A, 13A respectively. The beams 12B and 13B in FIG. 1 experience degraded carrier to interference performance due to the interference which results from beams 12A and 13A transmitted by antenna 15A having the same carrier frequencies and being directed in substantially the same direction.

Figure 3:
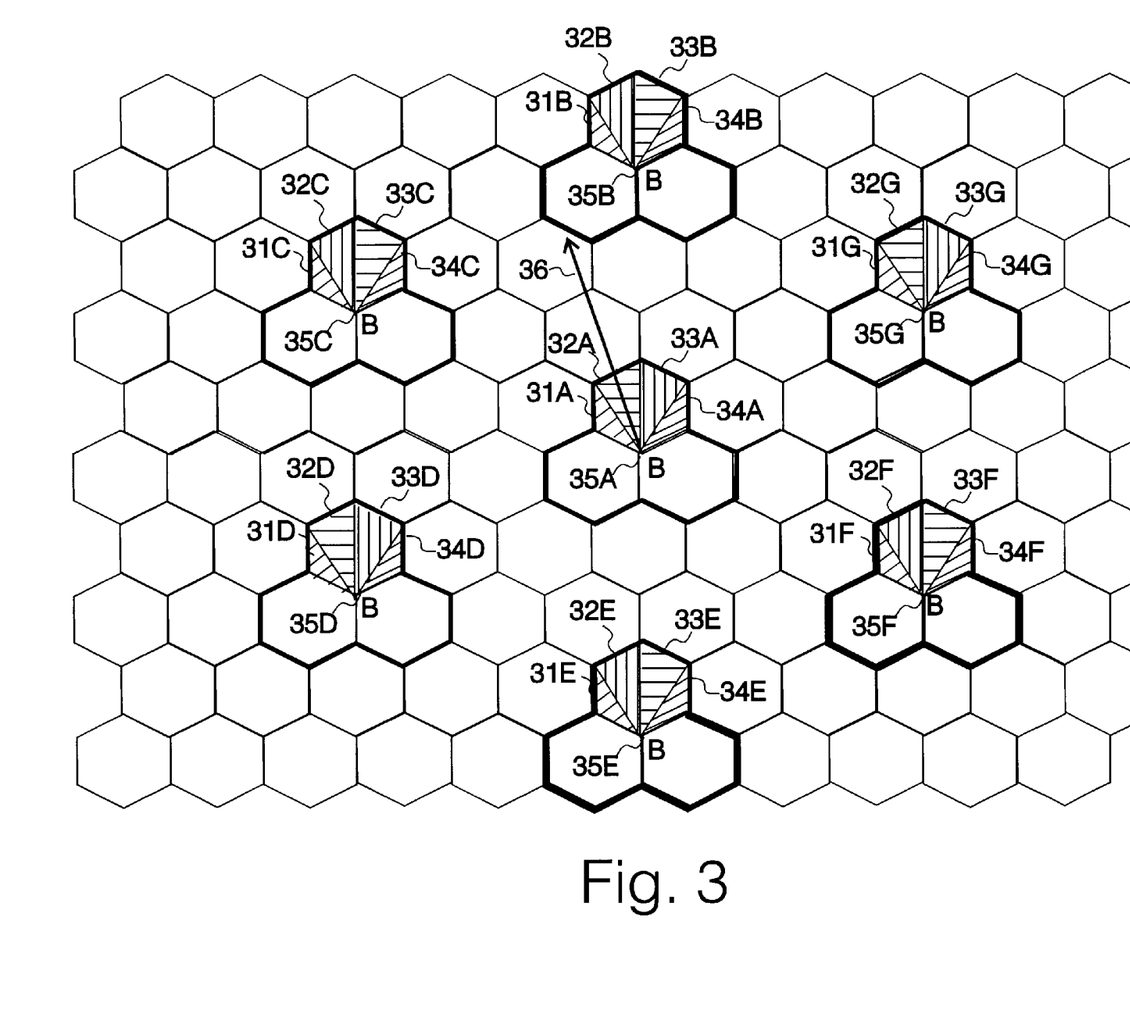
FIG. 3 illustrates a directional beam layout for edge excited cells having frequency re-use between cells with four beams per cell in a tri-cellular arrangement according to a specific implementation of the invention herein.

FIG. 3 herein illustrates a directional beam layout in a cell of a tri-cellular radio system with identical apparatus components to those shown in FIG. 1 but employing a specific method of arranging frequency re-use beams which is subject of the present invention. For ease of description hereinafter a method corresponding to one cell of a tri-cellular region supported by a base station will be described. It will be understood that coverage of all three cells supported by a base station requires duplication of the method described hereinafter. For this section of the description a beam referred to by a number 31 shall represent first outer beam 31A, 31B or any other beam of substantially similar direction supported by any base station which re-uses a common set of carrier frequencies. Likewise beams referred to by a number 32, shall represent first inner beams of substantially similar direction supported by any frequency re-use base station 35 in FIG. 3 and likewise for beams referred to by number 33, shall represent second inner beams adjacent the first inner beams, and beams referred to by number 34 shall represent second outer beams of any frequency re-use base station 35. First outer beam 31 has a like carrier frequency for all base stations 35 in FIG. 3. Second outer beam 34 also has a like carrier frequency for all base stations 35 in FIG. 3. However the carrier frequencies of first and second inner two beams 32 and 33 have been exchanged for each other as between first and second base stations 35A and 35B so that first inner beam 32A of first frequency re-use cell served by first base station 35A cell has the like carrier frequency as opposite second inner beam 33B of second frequency re-use cell of the second first tier frequency re-use base station 35B, and inner second beam 33A of the first frequency re-use cell has a like carrier frequency as opposite first inner beam 32B of the second frequency re-use cell. By a "like" frequency, it is meant either an identical frequency, or a frequency capable of causing interference. The pattern of alternating the carrier frequencies of the two inner beams transmitted by base stations 35A and 35B is repeated throughout the layout of frequency re-use base stations so that the inner two beams of all adjacent base stations have alternated carrier frequencies in order to minimize overall interference. A like carrier frequency occupies alternate directional beams which, whilst directed substantially in a general direction as each other, e.g., all pointing roughly north, or all pointing roughly south, or similarly all pointing roughly east or west, the alternate beams are not directed parallel to each other, but are disaligned from each other so that no beam is aligned in a same direction as an adjacent first tier frequency reuse beam.

A directional beam at a first base station carrying a like carrier frequency as one or a plurality of other beams operating from one or more other base stations has a boresight pointed away from other said base stations such that an arc or azimuth of said directional beam is not directed at any beams operating said like carrier frequency of said other base stations.

For example, first beam 32A operating from first base station 35A and carrying a like carrier frequency to first tier frequency re-use base stations 35C and 35B has its boresight (indicated as direction of arrow 36 in FIG. 3) directed away from all said first tier frequency reuse base stations, 35A–35G, such that an azimuth range of said first beam 32A is directed to minimize overlap with any first tier frequency reuse beams operating a like carrier frequency at a first tier frequency reuse base station.

In the arrangement of FIG. 3 herein, first base station 35A communicates with first cell area served by first set of beams 31A–34A and second frequency re-use base station 35B communicates with second cell area served by second set of frequency re-use beams 31B–34B. Outer beams 31A, 34A of the first beam set are directed in a substantially same direction as corresponding respective outer beams 31, 34 of the plurality of other beam sets (second to seventh beam sets 31–34 corresponding to second to seventh frequency re-use base stations 35B–35G). Because of the layout of the base stations, arranged substantially along straight lines parallel to each other, where frequency re-use base stations are spaced substantially equidistantly from each other along each line, the outer beams 31, 34 of a cell of a tri-cellular area extend along a line of sight which points towards an area between nearest adjacent corresponding respective frequency re-use beams 31, 34 of adjacent first tier frequency re-use base stations, and interference between outer frequency re-use beams 31, 34 of adjacent frequency re-use cells is relatively low as between center base station 35A and first tier frequency re-use base stations 35B–35G.

Frequency re-use first inner beams 32, of each frequency re-use cell along a line of base stations, for example a first line comprising fourth base station 35D, first base station 35A and seventh base station 35G are all directed in a same direction and use a like frequency. However, corresponding frequency re-use first inner beams of an adjacent parallel line of frequency re-use base stations, for example comprising second base station 35B and third base station 35C use a different frequency ie the frequency used by second inner beams 33 of the frequency re-use base stations along the first line comprising fourth base stations 35D, first base station 35A and seventh base station 35G. By the "different" frequencies, it is meant frequencies which are far enough apart from each other as to be effectively non-interfering with each other. In the tri-cellular areas corresponding to the base stations along the second line, the frequencies of the inner two beams 32, 33 are reversed as compared to the corresponding respective beams of tri-cellular areas served by base stations along adjacent parallel first line of base stations comprising fourth, first and seventh base stations 35D, 35A, 35G.

In other words, examining the relationship between frequency re-use at first base station 35A and second base station 35B, first base station 35A communicates with a first cell area of a tri-cellular area using a first set of beams, second frequency re-use base station 35B communicates with second cell of second tri-cellular area using a second set of beams, at least one beam of the first set being directed in a substantially same direction as a corresponding beam of the second set, and at least one remaining beam of the first set which re-uses a second same frequency as a beam of the second set, being directed away from that beam. Outer beams 31A, 34A of the first set of beams have a substantially same direction as corresponding respective outer beams 31B, 34B of the second set of beams, corresponding respective beams of each set pointing in substantially the same direction as each other and using a like frequency as each other. Inner beams 32A, 33A of first beam set and inner beams 32B, 33B of second beam set re-use a like two frequencies as each other, however first inner beam 32A of the first set having a like common re-used carrier frequency with second, opposite inner beam 33B of the second set are directed in different directions to each other, and second, opposite inner beam 33A of the first set having a same common carrier frequency as first inner beam 32B of the second set also are directed in different directions to each other. A necessary degree of disalignment between beams 33A and 32B which use like frequencies to each other and are directed away from each other, is a disalignment which is necessary to significantly reduce interference between like carrier frequencies between those beams. In the case of a fixed beam TDMA deployment having four beams per 120° azimuth angle as shown in FIG. 3 herein, beams 33A and 32B are directed away from each other by an angle of the order 45° measured between extrapolated lines coincident with centers of beams 33A, 32B. However, for edge excited cells having a greater number of beams, an angle of disalignment from parallel between beams of different cells reusing a like frequency may be lower.

The first set of beams 31A–34A extending from the first base station 35A are arranged in a first pattern, extending radially from the first base station, whereas the second set of beams 31B–34B extend in a second pattern substantially radially outwardly from the second base station 34B, the first and second sets of beams re-using a common set of carrier frequencies, the carrier frequencies being assigned to the first set of beams 31A, 34A in a different order as compared with their assignment to the second set of beams 31B–34B.

Figure 4:
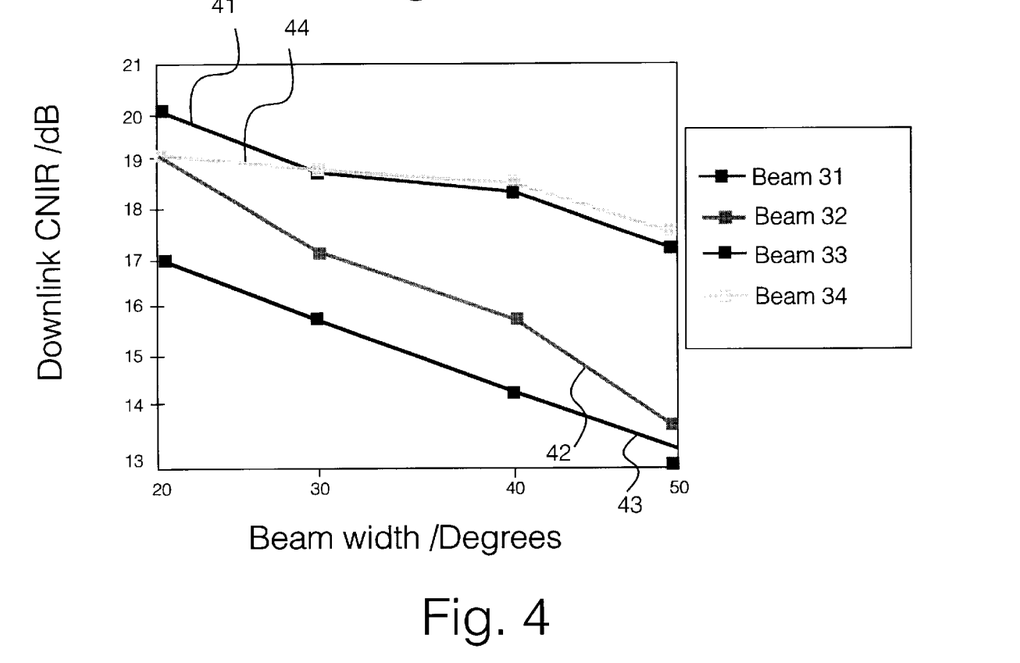
FIG. 4 illustrates a carrier to noise and interference ratio graph corresponding to the layout in FIG. 3.

FIG. 4 herein illustrates carrier to interference ratio graphs corresponding to four beams transmitted by a base station 35 in the beam layout shown in FIG. 3. Graph line 41 shows a carrier to interference level in decibels on a vertical axis plotted against beam width for beam 31 in FIG. 3 over beamwidths in the range 20° to 50°. Likewise graph lines 42, 43 and 44 correspond to beams 32, 33 and 34 in FIG. 3 respectively.

As can be seen from graph lines 42 and 43 in FIG. 4 inner two beams 32 and 33 in FIG. 3 achieve a relatively higher carrier to interference performance for beamwidths in the range 20° to 50°. An improvement in carrier frequency to interference performance resulting from alternating the re-used carrier frequencies between inner beams 32 and 33 in FIG. 4 is seen for both inner beams represented by graph lines 42 and 43, as compared to the arrangement of FIG. 1 herein. For graph line 42 (representing beam 32 in FIG. 3) the carrier to interference performance is improved significantly. For graph line 43 (representing beam 33 in FIG. 3) the carrier to interference performance is also improved.

The beam pattern arrangement illustrated with reference to FIG. 3 herein, may reduce interference as between inner beams 32, 33 of immediately adjacent frequency re-use cells. However, it does not improve the situation as between second tier frequency re-use cells, for example as between frequency re-use base stations 35E and 35B in FIG. 3. Further, although first and second inner beams 32, 33 of adjacent first tier frequency re-use cells are directed away from each other in the arrangement shown in FIG. 3, in practice, cellular pattern coverage is rarely so cleanly geometrical as suggested by the pattern of FIG. 3, and directional beams may not be perfectly aligned in a regular pattern in a practical deployment. Thus, although interference is reduced as between first and second inner beams of first tier frequency re-use cells, there will still remain interference. Similar considerations also apply to outer beams 31, 34.

Figure 5:
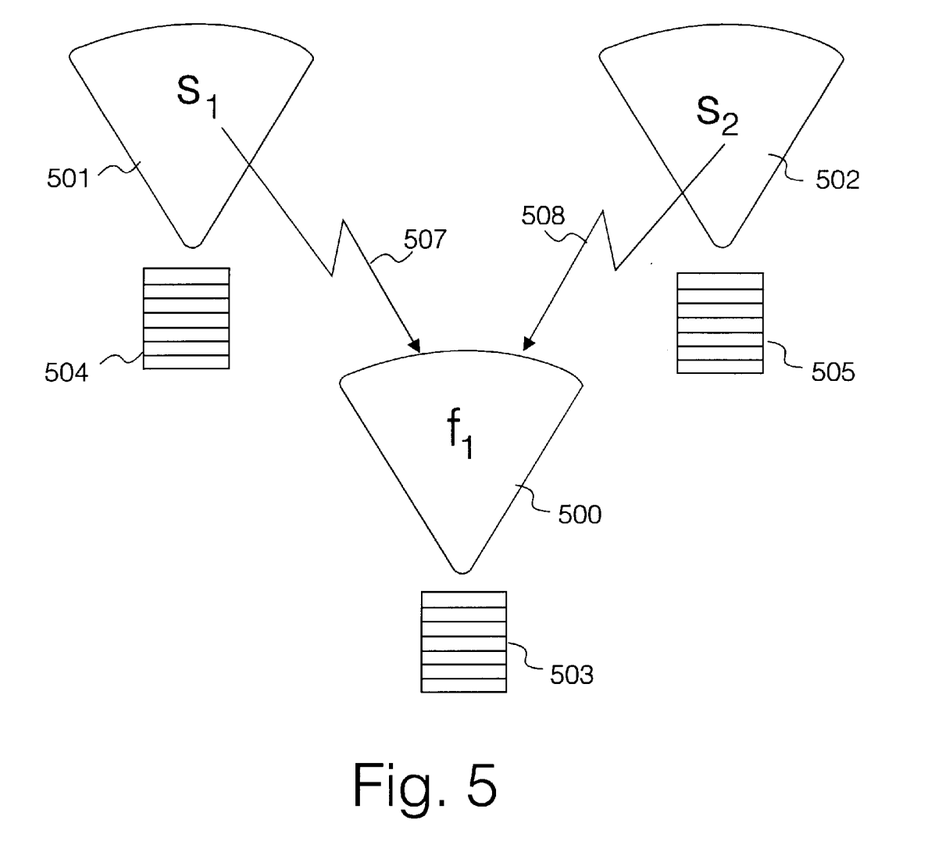
FIG. 5 illustrates schematically a general problem of interference between cells in a center excited or tri-cellular arrangement.

Referring to FIG. 5 herein, there is illustrated schematically individual beams of a hexagonal cellular area coverage pattern, which are potentially interfering for a general case of either center or edge excited cells. For the purposes of clarity, other non-interfering beams are not shown in FIG. 5 herein, but it will be understood by person skilled in the art that the spaces between individual beams 500, 501, 502 are occupied by non-interfering cells. It will be understood that there are further interfering cells across the rest of the network. Each cell is provided with a corresponding plurality of transceivers 503–505 respectively, each transceiver operating at a different carrier frequency to other transceivers within the same cell. A subscriber S1 present in second cell 501 may make transmissions on an uplink, which are received by first cell 500 as interference. Such transmissions are illustrated in FIG. 5 by arrow 507. Similarly, a second subscriber S2 in third cell 502 may make uplink transmissions indicated by arrow 508 which are received in first cell 500 as interference. Conversely, downlink transmissions issuing from first cell 500 may be received by first and second subscriber handsets S1, S2 as interference in second and third cells 501, 502 respectively.

A general problem addressed by the specific implementation of the present invention is to further reduce interference between frequency re-use cells as illustrated schematically in FIG. 5, but also specifically to reduce interference between frequency reuse cells of an edge excited arrangement as shown in FIGS. 1 and 3 herein.

In the North American digital AMPS standards International Standards IS-54 and related standards and related standards IS-136–IS-138, there is a constraint on downlink transmission which makes the effective use of frequency hopping for the purpose of improving carrier to interference ratio (as used in GSM/PCS) difficult to use and significantly restricts any benefit which may be gained by the frequency hopping technique. Thus, this technique is not very effective for the purpose of achieving a better frequency reuse factor n in digital AMPS TDMA systems. However, according to the specific implementation herein, the inventors have found that significant improvements in C/I ratio may be achieved by restricting the amount of traffic signals carried on each directional beam. Although this has the disadvantage of reducing overall traffic capacity of those beams, an improvement in C/I ratio obtained by partial loading of signals onto the beams enables greater frequency reuse overall, in a cellular radio system.

The reduction of interference obtained by rearrangement of the inner beams between first tier frequency reuse cells, combined with the reduction in interference obtained by restricting signal loading on some of the beams may enable an increase in frequency reuse from n=7 to n=4 or n=3 in an edge excited tri-cellular arrangement using a plurality of directional beams per cell. A reduction in traffic carrying capacity encountered due to restrictions of signal loading of some of the beams applied in order to reduce interference may be lower than the increase in traffic carrying capacity provided by the decreased frequency re-use factor enabled by the improvements in carrier to interference ratio.

Subscribers S1, S2 in cells 501, 502 respectively in FIG. 5 use the same frequency $f_1$ as used in first cell 500, or like frequencies which are close enough to frequency $f_1$ to be interfering. When frequency $f_1$ is used for communication in the first cell 500, and at the same time subscribers S1 and/or S2 are operating in first and second reuse cells 501, 502, then interference between cell 500 and first reuse cell 501 and/or interference between cell 500 and second reuse cell 502 will occur. In a worst case, where frequency $f_1$ is operated in cell 500 continuously, and subscribers are present in first reuse cell 501 and second reuse cell 502, operating at the same frequency $f_1$, or frequencies close enough to $f_1$ to cause interference, then there will be continuous interference between the cell 500, and first and second reuse cells, the interference being on the uplink in the cell 500, and on the downlink in the first and second reuse cells 501, 502 respectively.

Figure 6:
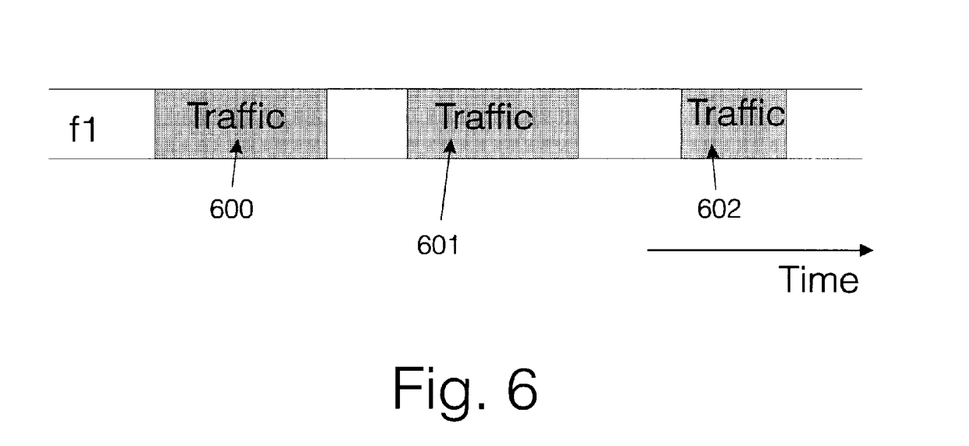
FIG. 6 illustrates schematically an example of signal loading of one carrier frequency of one beam of a cell area, over time.

However, demand for communications from subscriber mobiles is statistical in nature. At any particular time, demand for communications within a cell may fluctuate, and in practice any particular carrier frequency operating within a cell may not be fully utilized for all of the time. As illustrated schematically in FIG. 6 herein, there is shown signal loading of a single carrier frequency $f_1$ with time. Shaded areas 600–602 represent periods of utilization when the carrier frequency $f_1$ is occupied by communications traffic and/or signaling on a downlink. Similarly, each other downlink frequency and each uplink frequency of the cell may only be partially utilized over time. Therefore, the actual carrier to interference ratio experienced in practice will depend upon the signal loading of each of the carrier frequencies within a cell. When a beam is not carrying signals, it does not radiate and therefore cause no interference. Loading of the carrier frequencies within a cell in response to communications demand from subscribers may be restricted at each mobile base station by application of algorithms which allocate subscriber calls to transceivers and channel frequencies. However, restricting the loading of carrier frequencies has a disadvantage in that it reduces system traffic carrying capacity, which manifests itself practically as call blocking. For any given percentage of overall utilization of a number of carrier frequencies, there will be a probability that a new subscriber wishing to communicate within a cell will be unable to communicate due to lack of available carrier frequencies. This is known as call blocking. That is to say, where carrier frequencies of a cell are partially loaded with signals at less than 100% of their available signal carrying capacity, at each percentage of available capacity there is a probability of call blocking. The probability of call blocking is related directly to the number of available transceivers in each cell, and the loading of transceivers at any particular time. It is estimated that for a set of transceivers assigned to a base station, each transceiver operating a separate carrier frequency, if all the transceivers in the cell are utilized to an overall loading of 80% of maximum available capacity, this estimates to a full loading call blocking probability for a new subscriber wishing to communicate within that sector of around 2%. That is to say, a new subscriber in a sector requesting call set up stands around a 2% chance of there being a transceiver unavailable to carry that call, where the overall loading of all transceivers in that sector is 80%. The statisics of how much restriction of loading of a carrier frequency in a TDMA system can be applied is different between uplink transmissions and downlink transmissions. On a TDMA downlink according to IS136, a single carrier frequency can support three mobiles on three respective different time slots. Thus, if only one mobile is present, the downlink carrier frequency still cannot be turned off. All three timeslots on a downlink carrier frequency must be vacant before the downlink carrier can be turned off. On the other hand, on the uplink usage of transmissions from individual mobile stations can be restricted individually without affecting other mobiles, because each mobile communicates only on one timeslot.

A relationship between the rearrangement of carrier frequencies as illustrated in FIG. 3 and the probability of call blocking exists, because the effective pool of available frequencies in a cell is increased through rearrangement of directional beams in adjacent frequency reuse cells. The probability of call blocking $P_c$, the number of carrier frequencies in the pool n and the utilization of carrier frequencies are all inter-related. The inventors have estimated that by constraining loading of a set of carrier frequencies within a cell, such as to permit a maximum utilization of all carrier frequencies within a cell in the range 40%–60%, and by implementing carrier frequency reassignments as illustrated in FIG. 3 herein, a frequency reuse factor improvement from n=7 to n=3 may be achieved in a digital AMPS TDMA deployment.

Since applying a loading restriction to a beam reduces the traffic carrying capacity of that beam, there is a trade-off involved in applying restriction to the loading on a beam, and in any particular deployment of beams the degree of loading restriction on each beam needs to be optimized. One strategy is to apply a partial loading restriction to a beam experiencing a worst carrier to interference ratio in a cell for example second inner beam 33 in FIG. 3, as illustrated with reference to FIGS. 4 and 7 herein.

In an ideal hexagonal cellular pattern on flat terrain, an optimized restriction on usage of carrier frequencies imposed on all beams which experience co-frequency interference from neighboring beams would require that some carrier frequencies were restricted on each base station of the system. However, on a more typical deployment, where the terrain is undulating, and the cells are not perfectly hexagonal in area, at some base stations, restriction of usage of carrier frequencies may not be necessary where like carrier frequency interference is low. A practical pattern of carrier frequency usage restriction for a deployment of base stations may be formulated using information obtained by measuring base station radiation patterns, and by prediction on computer model propagation tools.

Figure 7:
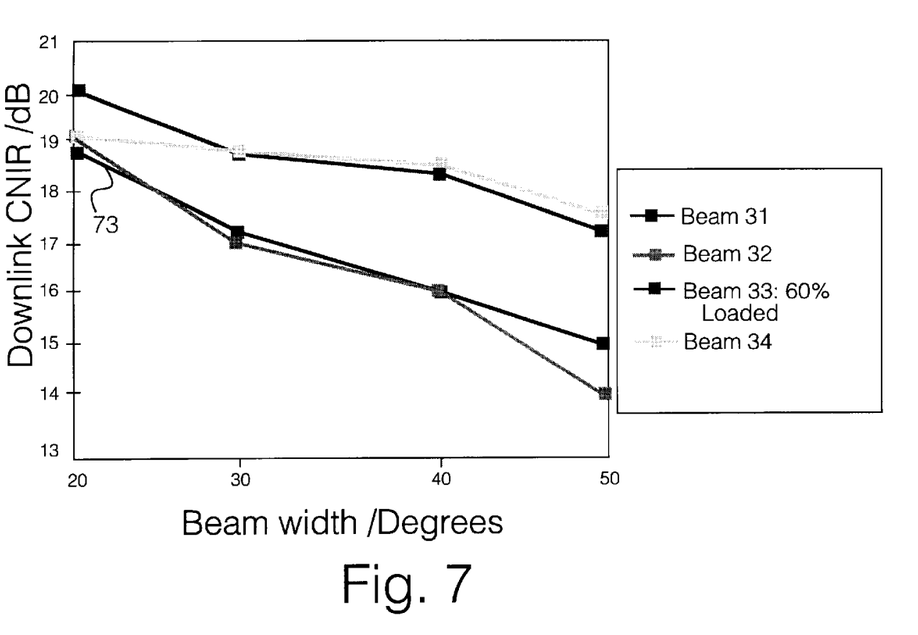
FIG. 7 illustrates a carrier to interference ratio for four directional beams occupying a cell of an edge excited tri-cellular arrangement, in which one beam is restricted to a signal loading of 60% of its maximum available loading.

Referring to FIG. 7 herein, there is illustrated a carrier to interference ratio graph corresponding to four beams transmitted by a base station 35 in the beam layout shown in FIG. 3, where second inner beam 33, illustrated by line 73 in FIG. 7, has applied to it a restriction on its utilization such that it is partially loaded up to a maximum of 60% of its theoretical maximum loading. Such limitation can be applied in practice by applying a software limit in base station apparatus such as to restrict the amount of time when a transceiver corresponding to a carrier frequency carried on second inner beam 33 transmits on the downlink. As illustrated by FIG. 7, applying a restriction on the loading on second inner beam 33 improves the C/I performance significantly as can be seen by comparing line 73 in FIG. 7 in which the second inner beam 33 is partially loaded to a value of 60% maximum utilization with the line 43 in FIG. 4 herein where beam 33 may be fully loaded. However, in the example of FIG. 7, applying a maximum loading of 60% onto a beam corresponds to an approximate decrease in the number of available traffic channels on the beam by 25%, compared to the case where the beam is fully loaded (100%). For partial loading of a carrier frequency of one beam in a cell comprising four beams this corresponds to an overall reduction in cell capacity from 65.5 Erlangs in the unrestricted (full loading allowed) case to approximately 61 Erlangs in the case where partial loading is applied to a single beam.

Figure 8:
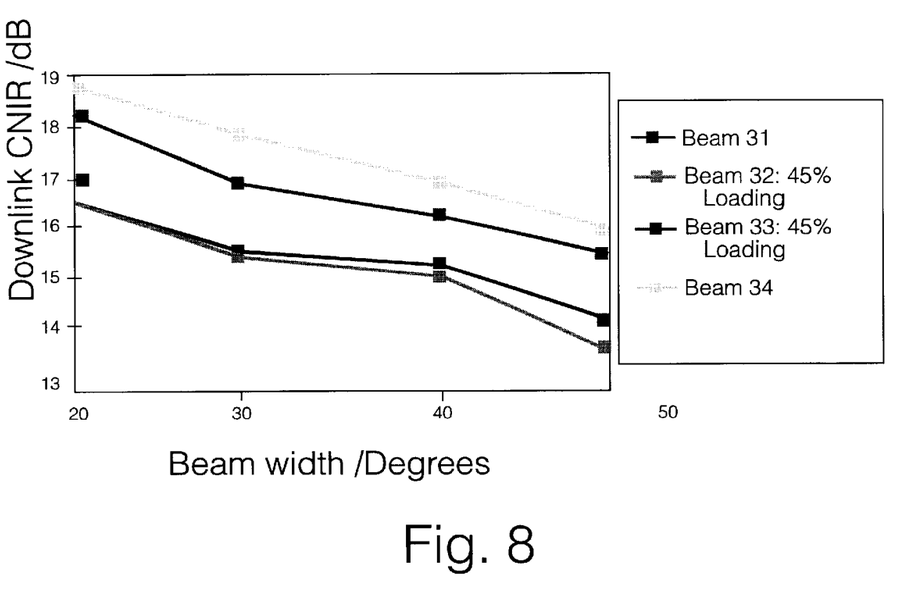
FIG. 8 illustrates schematically a plot of downlink beam carrier to interference ratio against beamwidth for four directional beams in a cell of a tri-cellular edge excited arrangement, where two beams of the cells are restricted to 45% traffic loading of their nominal maximum available loading.

Referring to FIG. 8 herein, there is illustrated a graph of carrier to interference ratio against beam width for a tri-cellular arrangement having four beams per cell, where a respective carrier frequency of each of first and second inner beams 32, 33 respectively are each restricted to operate at no more than 45% of maximum available loading. The two outer beams 31, 34 are usable at full loading. The arrangement illustrated with reference to FIG. 8 may result in a reduction in interference between beams such that an n=3 frequency reuse, can be achieved with an acceptable C/I ratio. This may produce cell a capacity of the order of 77 Erlangs, which represents a 17% increase in capacity on an n=4 corner excited solution. Similarly, partial loading of the first and second inner beams restricts the overall capacity gains that can be achieved.

However, although the best mode described above relates to a tri-cellular arrangement, equivalent beam configurations as described with reference to FIG. 3 herein combined with signal loading restrictions to carrier frequencies as described herein are equally applicable to center excited cellular systems. For a center excited base station using n=3 reuse having four nominal 50° beamwidth directional beams per cell in a tri-cellular area, application of a loading restriction of 60% may reduce the overall base station capacity by order of 25% compared to the case where no loading restriction is applied. By applying a 60% signal loading restriction to beams experiencing worst interference, a capacity of the order of 81 Erlangs may be achieved, representing an increase in capacity of the order of 9% over the n=4 center excited case where no signal loading restriction is applied. This compares with an n=4 corner excited deployment, in which an improvement of 17% may be achievable compared to the equivalent unrestricted case by applying a 60% loading restriction.

Figure 9:
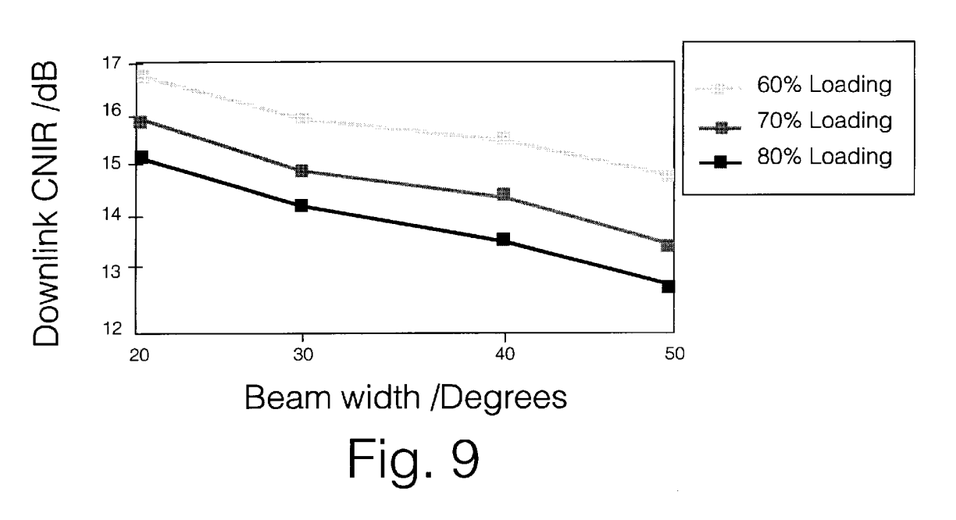
FIG. 9 illustrates schematically relative downlink carrier to interference ratios of one beam of a four beam per 120° sector arrangement in a center excited hexagonal cellular deployment, where the maximum loading of the beam is varied in the range 60–80% of its maximum available loading.

Referring to FIG. 9 herein, there is illustrated a plot of downlink carrier to interference ratio against beamwidth in degrees for a first inner beam of a center excited hexagonal cell sector having four directional beams per 120° sector in an n=3 reuse configuration. FIG. 9 illustrates a difference between various degrees of loading of a beam in the range 60%–80%, illustrating that as the percentage of loading is decreased on the beam, the carrier to interference ratio improves for all beamwidths.

What is claimed is:

1. In a cellular radio communications system having a plurality of base stations each for communicating over at least one corresponding tri-cellular region using a plurality of directional beams, the tri-cellular region having three corner excited cells, a method of configuring the plurality of directional beams comprising:

arranging each of the base stations at the center of the corresponding at least one tri-cellular region:

arranging the plurality of beams across each of the cells such that a pair of beams which reuse a like carrier frequency as each other are disaligned with respect to each other;

selecting at least one of the beams reusing the like carrier frequency; and restricting usage of the like carrier frequency on the at least one selected beam.

2. The method according to claim 1, wherein said step of arranging the plurality of beams comprises:

at a first of the base stations, forming a first set of beams in a first tri-cellular region;

at a second of the base stations, forming a second set of beams in a second tri-cellular region;

wherein at least one beam of the first set is directed in a substantially same direction to and reuses a first carrier frequency as at least one beam of the second set; and at least one remaining beam of the first set reuses a second carrier frequency as at least one remaining beam of the second set, the remaining beam of the first set being disaligned away from the remaining beam of the second set.

3. The method according to claim 2, wherein said beam forming steps each comprise forming four beams.

4. The method according to claim 1, wherein said step of restricting usage comprises restricting a proportion of time during which the like carrier frequency is available for transmission on the at least one selected beam.

5. The method according to claim 1, further comprising:

forming a first beam of the pair of beams at a first of the base stations; and forming a second beam of the pair of beams at a second of the base stations;

wherein the first and second base stations comprise first tier frequency reuse base stations.

6. The method according to claim 1, further comprising:

using a first inner beam within a first of the cells;

using a first outer beam within the first of the cells;

using a second inner beam within a second of the cells;

using a second outer beam within the second of the cells; and restricting usage of at least one of the inner beams.

7. The method according to claim 1, wherein the step of selecting the at least one beam comprises selecting a beam that causes the highest amount of interference with the like carrier frequency.

8. A cellular radio system comprising a plurality of base stations each for communicating over at least one corresponding tri-cellular region using a plurality of directional beams, the at least one tri-cellular region having three corner excited cells, the base stations being arranged at the center of the corresponding at least one tri-cellular region, and the plurality of base stations operating to:

arrange the plurality of beams across each of the cells such that a pair of beams which reuse a like carrier frequency as each other are disaligned with respect to each other;

select at least one of the beams reusing the like carrier frequency; and restrict usage of the like carrier frequency on the at least one selected beam.

9. In a cellular radio communications system having a plurality of base stations each for communicating over at least one corresponding tri-cellular region using a plurality of directional beams, the tri-cellular region having three corner excited cells, a method of configuring the directional beams comprising:

arranging each of the base stations at the center of the corresponding at least one tri-cellular region;

arranging the plurality of beams across each of the cells such that individual ones of the beams that reuse a like carrier frequency as each other are disaligned with respect to each other; and restricting usage of the like carrier frequency on selected ones of the plurality of beams.

10. The method according to claim 9, wherein said restricting step comprises selecting a plurality of beams causing a significant level of like carrier frequency interference.

11. The method according to claim 9, wherein said step of arranging the plurality of beams across each of the cells comprises arranging a first beam operating at the like carrier frequency so as to reduce the amount of overlap between first beam and any re-use beams operating at the like carrier frequency.

12. A cellular radio communications system comprising:

a plurality of base stations each for communicating over at least one corresponding tri-cellular region using a corresponding plurality of directional beams, the tri-cellular region having three corner excited cells;

a common pool of carrier frequencies for the directional beams such that like carrier frequencies are reused as between different ones of the base stations, wherein usage of at least one of the like carrier frequencies is restricted and wherein beams from different ones of the base stations having the like carrier frequencies are disaligned with respect to each other.

13. The cellular radio communications system according to claim 11, wherein the usage restriction of at least one of the like carrier frequencies comprises a temporal restriction of transmission of said at least one of the like carrier frequencies.

14. A method for improving the carrier to interference ratio of a cellular radio communications system, comprising:

arranging a plurality of base stations each for communicating over a corresponding tri-cellular region through the use of a plurality of directional beams, the tri-cellular region having three corner excited cells;

arranging the plurality of beams across each of the cells such that a pair of beams which reuse a like carrier frequency are disaligned with each other;

selecting at least one of the beams reusing a like carrier frequency; and restricting usage of the like carrier frequency on the at least one selected beam.

15. The method according to claim 14, wherein said step of arranging the plurality of beams comprises:

at a first of the base stations, forming a first set of beams in a first tri-cellular region;

at a second of the base stations, forming a second set of beams in a second tri-cellular region;

wherein at least one beam of the first set is directed in a substantially same direction to and reuses a first carrier frequency as at least one beam of the second set; and at least one remaining beam of the first set reuses a second carrier frequency as at least one remaining beam of the second set, the remaining beam of the first set being disaligned away from the remaining beam of the second set.

16. The method according to claim 15, wherein said beam forming steps each comprise forming four beams.

17. The method according to claim 14, wherein said step of restricting usage comprises restricting a proportion of time during which the like carrier frequency is available for transmission on the at least one selected beam.

18. The method according to claim 14, further comprising:

forming a first beam of the pair of beams at a first of the base stations; and forming a second beam of the pair of beams at a second of the base stations;

wherein the first and second base stations comprise first tier frequency reuse base stations.

19. The method according to claim 14, further comprising:

using a first inner beam within a first of the cells;

using a first outer beam within the first of the cells;

using a second inner beam within a second of the cells;

using a second outer beam within the second of the cells; and restricting usage of at least one of the inner beams.

20. The method according to claim 14, wherein the step of selecting the at least one beam comprises selecting a beam that causes the highest amount of interference with the like carrier frequency.

* * * * *

UNITED STATES PATENT AND TRADEMARK OFFICE
CERTIFICATE OF CORRECTION

PATENT NO. : 6,078,814
DATED : June 20, 2000
INVENTOR(S) : Jeffries et al.

It is certified that error appears in the above-identified patent and that said Letters Patent is hereby corrected as shown below:

Column 14,
Line 42, "first" should read -- the first --;
Line 57, "claim 11," should read -- claim 12, --;

Column 10,
Line 67, "cause" should read -- causes --;

Column 11,
Line 28, "statisics" should read -- statistics --;

Signed and Sealed this

Fourth Day of December, 2001

*Attest:*

*Attesting Officer*

NICHOLAS P. GODICI
*Acting Director of the United States Patent and Trademark Office*